US011303712B1

(12) United States Patent
Li et al.

(10) Patent No.: US 11,303,712 B1
(45) Date of Patent: Apr. 12, 2022

(54) SERVICE MANAGEMENT IN DISTRIBUTED SYSTEM

(71) Applicant: International Business Machines Corporation, Armonk, NY (US)

(72) Inventors: Guan Chao Li, Shanghai (CN); Kun Yan Yin, Ningbo (CN); Sheng Hui Zhan, Ningbo (CN); Zhe Xue, Chengdu (CN); Gang Ning, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/226,604

(22) Filed: Apr. 9, 2021

(51) Int. Cl.
*H04L 67/51* (2022.01)
*H04L 43/16* (2022.01)
*H04L 67/01* (2022.01)

(52) U.S. Cl.
CPC .............. *H04L 67/16* (2013.01); *H04L 43/16* (2013.01); *H04L 67/42* (2013.01)

(58) Field of Classification Search
CPC ...... G06F 16/27; G06F 16/9024; G06F 9/547; G06F 16/2358; G06F 21/60; G06F 9/45558; G06F 16/212; G06F 16/24526; G06F 16/24575; H04L 67/10; H04L 67/1008; H04L 12/2827
See application file for complete search history.

(56) References Cited

U.S. PATENT DOCUMENTS

| | | | |
|---|---|---|---|
| 10,656,929 B2 | 5/2020 | Jamjoom | |
| 2005/0038890 A1* | 2/2005 | Masuda | H04L 67/1023 709/224 |
| 2005/0165932 A1* | 7/2005 | Banerjee | H04L 69/16 709/226 |
| 2011/0047084 A1* | 2/2011 | Manzalini | G06F 9/505 705/301 |
| 2012/0259912 A1* | 10/2012 | Kruse | G06F 16/122 709/203 |
| 2016/0342409 A1* | 11/2016 | Acker | G06F 8/65 |
| 2018/0307524 A1* | 10/2018 | Vyas | G06F 9/45504 |
| 2019/0294636 A1* | 9/2019 | Albrecht | G06Q 20/389 |
| 2020/0183652 A1 | 6/2020 | Krebs | |

(Continued)

OTHER PUBLICATIONS

"Kubernetes-sigs / kubefed: Kubernetes Cluster Federation", GitHub, downloaded from the internet on Mar. 30, 2021, 4 pages, <https://github.com/kubernetes-sigs/kubefed>.

(Continued)

*Primary Examiner* — Michael A Keller
*Assistant Examiner* — Thao D Duong
(74) *Attorney, Agent, or Firm* — Nicholas A. Welling

(57) ABSTRACT

An approach for service management in a distributed system may be provided. The approach may include obtaining a first service record for a first service that is deployed in a first cluster in a distributed system, the first service record may be represented in a global registry format defined in the distributed system. Additionally, the approach may include calling a first service entrance for the first service based on the first service record, the first service entrance may enable a second service, deployed in a second cluster in the distributed system, to call the first service. Further, the approach may include providing the first service entrance to the second cluster.

20 Claims, 6 Drawing Sheets

(56) References Cited

U.S. PATENT DOCUMENTS

2020/0314173 A1* 10/2020 Pahwa ................ H04L 67/1021
2021/0132974 A1* 5/2021 Watt, Jr. ................ G06F 9/4856
2021/0306219 A1* 9/2021 Toy ........................ H04L 67/10

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

SERVICE MANAGEMENT IN DISTRIBUTED SYSTEM

BACKGROUND

The present invention relates to distributed system management, specifically, managing services deployed across multiple clusters in the distributed system.

A distributed system may be implemented in a heterogeneous structure and provide various services. The distributed system may comprise multiple clusters, and each cluster may have its own registry policy for managing services that are deployed in the cluster. For example, one cluster may relate to a Kubernetes®, framework and another cluster may relate to a Spring Cloud® framework. Services in the same cluster may be managed by the same registry policy, which enables these services to call each other. However, as different clusters may have different registry policies for managing their own services, a service deployed in one cluster cannot call another service deployed in another cluster.

SUMMARY

According to one embodiment of the present invention, there is provided a computer-implemented method that may be implemented by one or more processors. In the method, one or more processors obtain a first service record for a first service that is deployed in a first cluster in a distributed system, the first service record being represented in a global registry format defined in the distributed system. One or more processors determine a first service entrance for calling the first service based on the first service record, the first service entrance enabling a second service to call the first service, the second service being deployed in a second cluster in the distributed system. One or more processors provide the first service entrance to the second cluster.

According to another embodiment of the present invention, there is provided a computer-implemented system. The computer-implemented system comprises a computer processor coupled to a computer-readable memory unit, where the memory unit comprises instructions that when executed by the computer processor implements the above method.

According to another embodiment of the present invention, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
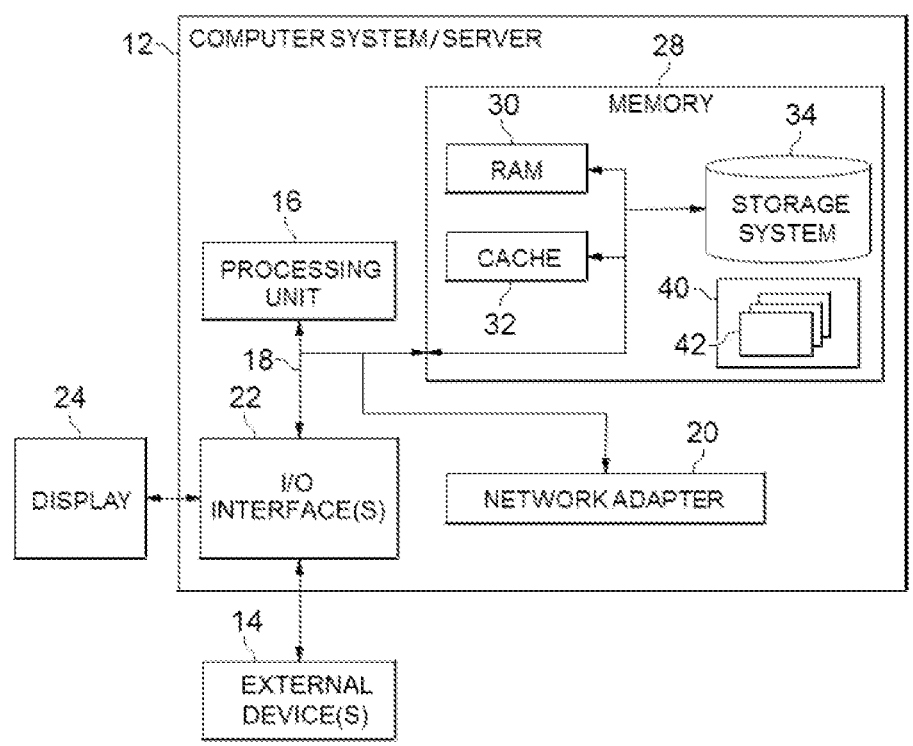
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of a cloud computing node is shown. Cloud computing node 1 is only one example of a suitable cloud computing node and is not intended to suggest any limitation as to the scope of use or functionality of embodiments of the invention described herein. Regardless, cloud computing node 1 is capable of being implemented and/or performing any of the functionality set forth hereinabove.

In cloud computing node 1 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
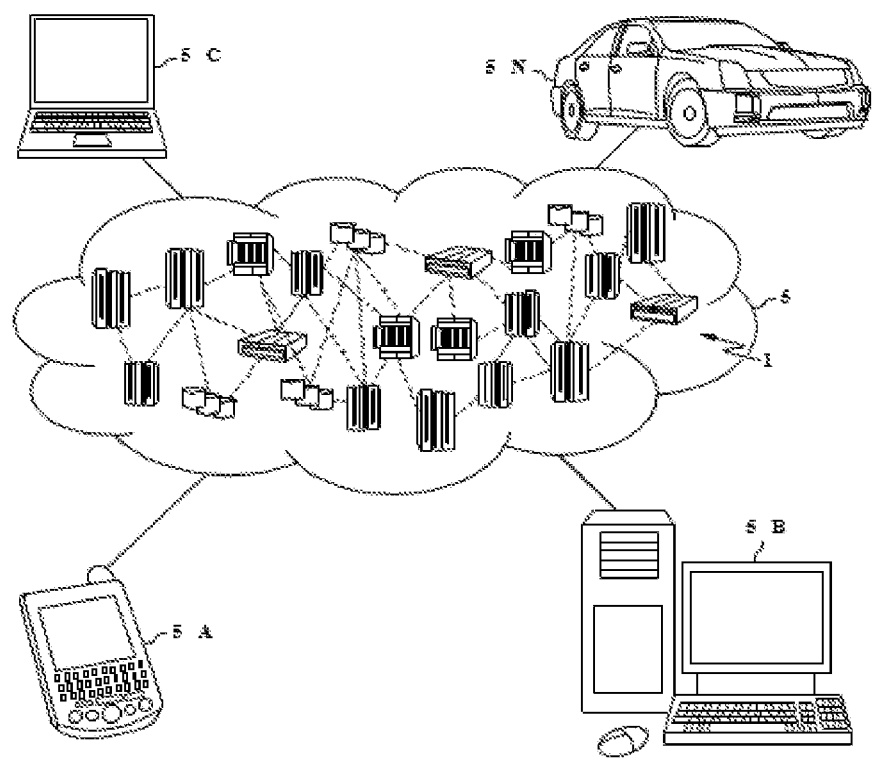
FIG. 2 depicts a cloud computing environment according to an embodiment of the present invention.

Referring now to FIG. 2, illustrative cloud computing environment 50 is depicted. As shown, cloud computing environment 5 includes one or more cloud computing nodes 1 with which local computing devices used by cloud consumers, such as, for example, personal digital assistant (PDA) or cellular telephone 5A, desktop computer 5B, laptop computer 5C, and/or automobile computer system 5N may communicate. Nodes 1 may communicate with one another. They may be grouped (not shown) physically or virtually, in one or more networks, such as Private, Community, Public, or Hybrid clouds as described hereinabove, or a combination thereof. This allows cloud computing environment 5 to offer infrastructure, platforms and/or software as services for which a cloud consumer does not need to maintain resources on a local computing device. It is understood that the types of computing devices 5A-N shown in FIG. 2 are intended to be illustrative only and that computing nodes 1 and cloud computing environment 5 can communicate with any type of computerized device over any type of network and/or network addressable connection (e.g., using a web browser).

Figure 3:
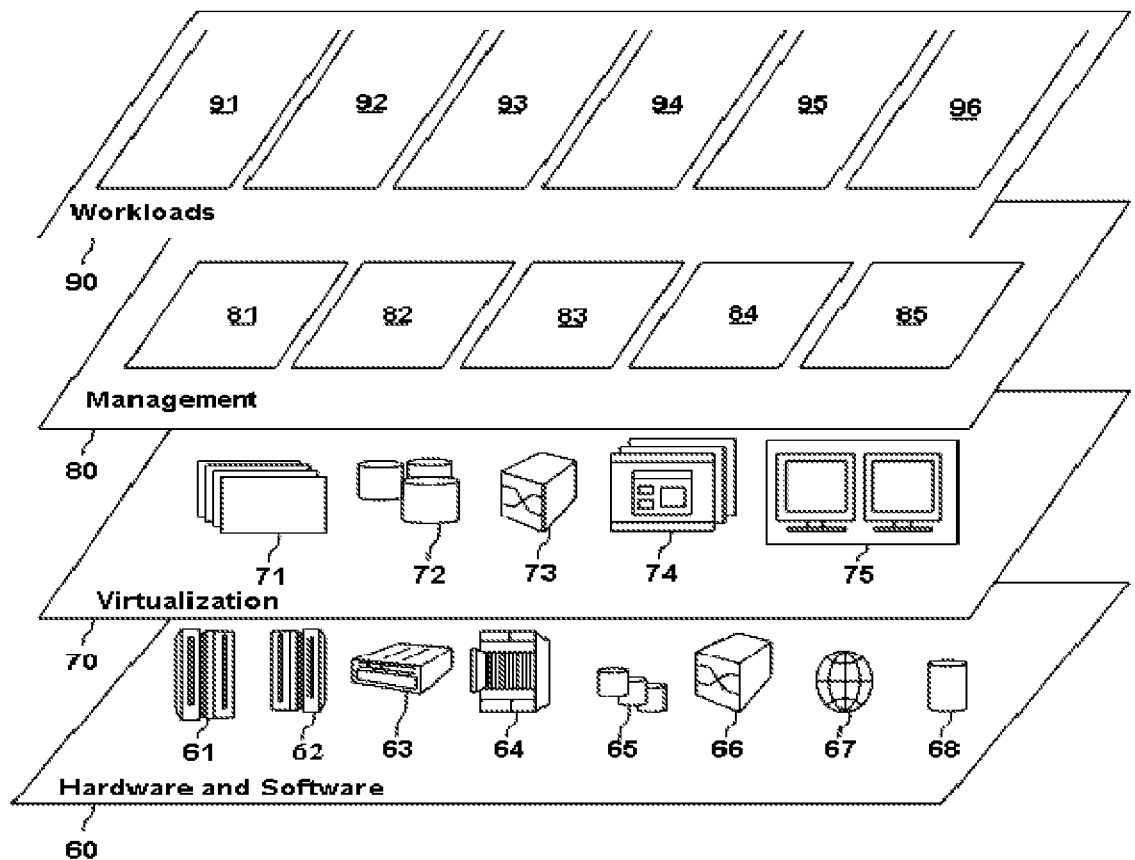
FIG. 3 depicts abstraction model layers according to an embodiment of the present invention.

Referring now to FIG. 3, a set of functional abstraction layers provided by cloud computing environment 5 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service management processing 96.

Figure 4:
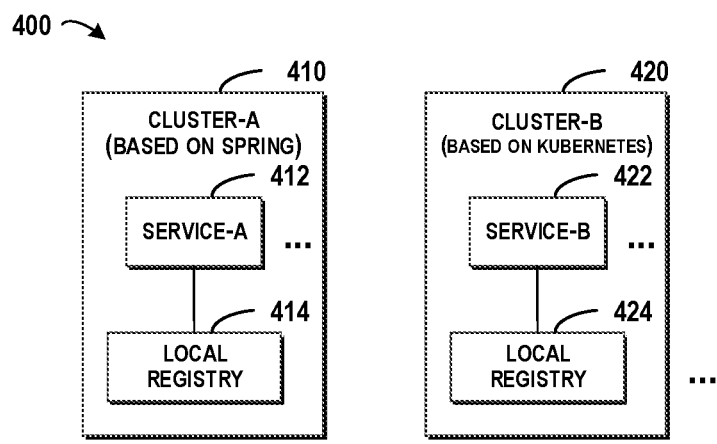
FIG. 4 depicts a block diagram of a distributed system according to an embodiment of the present invention.

It should be noted that the service management processing 96 according to embodiments of the present invention could be implemented by computer system/server 12 of FIG. 1. Reference will be made to FIG. 4 for a general description of a working environment of embodiments of the present invention. FIG. 4 depicts a block diagram of a distributed system 400 according to an embodiment of the present invention. In FIG. 4, the distributed system 400 comprises multiple clusters, such as a cluster named as cluster-a 410 and a cluster named as cluster-b 420, and so on. Here, the multiple clusters may be generated by using heterogeneous frameworks like Spring Cloud®, Kubernetes®, Consul®, MicroProfile®, or any generally known or future known frameworks for generating clusters in. Each of these clusters may comprise one or more services for providing different functions.

Each cluster may have its own registry policy, and services belong to a specific cluster should obey a corresponding registry policy. There have been proposed several service registry policies such as Etcd®, Consul®, Eureka, Zookeeper®, and so on. For example, the cluster-a 410 may be based on the Spring Cloud® framework and services (such as a service-a 412, and so on) may follow the Eureka registry policy. Here, a local registry 414 is provided for managing services belong to the cluster-a 410 based on the Eureka registry policy. Similarly, the cluster-b 420 may be based on the Kubernetes® framework and services (such as a service-b 422, and so on) may follow the Zookeeper® registry policy. Here, a local registry 424 is provided for managing services belong to the cluster-b 420 based on the Zookeeper® registry policy. Although services in each cluster may call services belong to its own cluster, the different registry policies are usually incompatible with each other, and thus a service registered in a cluster cannot call another service registered in another cluster. Although FIG. 4 illustrates that two clusters are comprised in the distributed system 400, the distributed system 400 may comprise more than two clusters, and each cluster may adopt the same or different cluster framework and/or registry policies.

Figure 5:
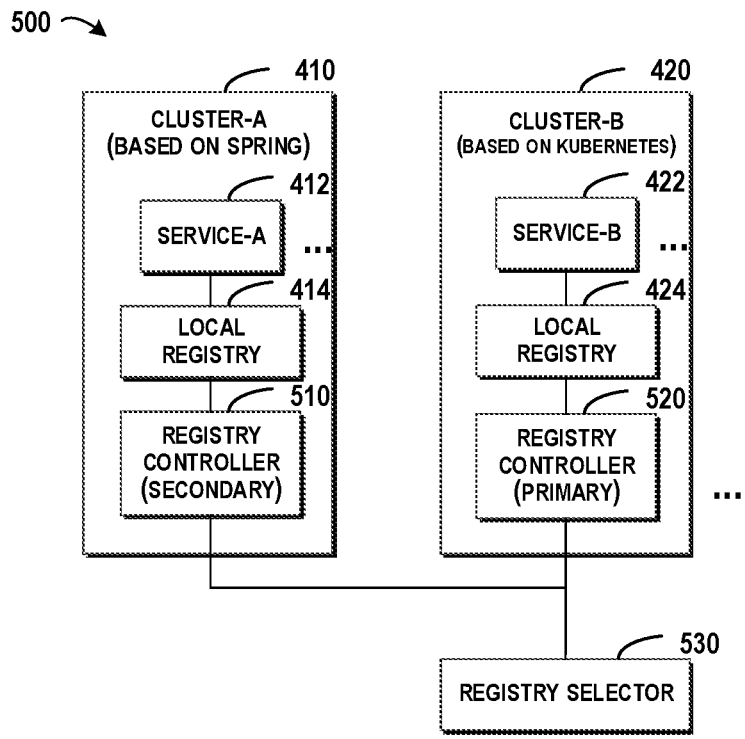
FIG. 5 depicts a procedure for managing a service in a distributed system according to an embodiment of the present invention.

In view of the above drawbacks, embodiments of the present invention provide a service management solution for enabling a service in one cluster to call a desired service in another cluster. Reference will be made to FIG. 5 for a brief description of embodiments of the present invention. FIG. 5 depicts a procedure 500 for managing a service in the distributed system according to an embodiment of the present invention. As depicted in FIG. 5, a registry controller may be deployed in each cluster for managing the service(s) belong to the cluster. Depending on functions of the registry controllers, the registry controllers may be classified into a primary type and a secondary type. For example, in the situation of two clusters being comprised in the distributed system 400, a registry controller 510 may be deployed in the cluster-a 410 and a registry controller 520 may be deployed in the cluster-b 420. As illustrated in FIG. 5, the registry controller 520 may be selected by a registry selector 530 as a primary one for coordinating the other registry controller(s) (such as the registry controller 510).

In FIG. 5, the local registries 414 and 424 represent registry controllers for managing the services in the respective clusters based on the existing registry policies, respectively. For example, the local registry 414 may obtain the local service record in the cluster-a 410 and manage the service-a 412 based on the Eureka registry policy, and the local registry 424 may obtain the local service record in the cluster-b 420 and manage the service-b 422 based on the Zookeeper® registry policy. Here, the local service records may be represented in respective local registry formats, and the registry controllers 510 and 520 may convert the local service records into service records that are represented by a global format defined in the distributed system 400. Therefore, the service in one cluster may be exposed to other services in other clusters based on the converted service records, such that these services may call each other across different clusters.

Figure 6:
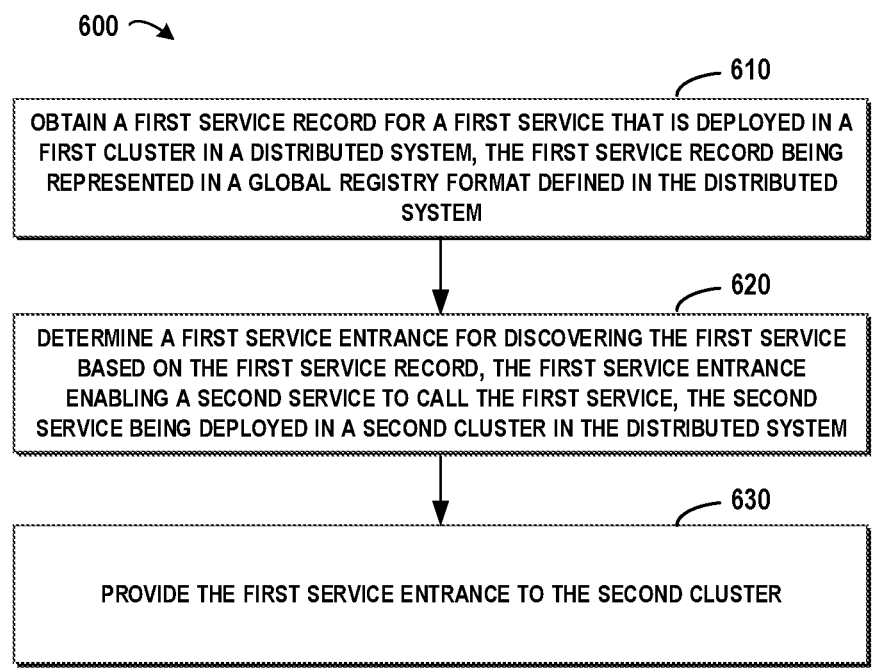
FIG. 6 depicts a flowchart of an example method for managing a service in a distributed system according to an embodiment of the present invention.

Hereinafter, reference will be made to FIG. 6 for more details about the present invention. FIG. 6 depicts a flowchart of an example method 600 for managing a service in a distributed system according to an embodiment of the present invention. At a block 610, a first service record may be obtained for a first service that is deployed in a first cluster in a distributed system 400. Here, the first service record is represented in a global registry format defined in the distributed system 400. In embodiments of the present invention, the first service record may be received from a first registry controller that is deployed in the first cluster.

Referring back to FIG. 5 for more details, the registry controller 510 may be deployed in the cluster-a 410 for obtaining the service record for the service-a 412. Here, the registry controller 510 may be deployed in a computing device comprised in the cluster-a 410. There may be multiple computing devices in the cluster-a 410 and one computing device may be selected for deploying the registry controller 510. For example, a server for managing the cluster-a 410 may be selected. The registry controller 510 may collect a local service record for the service-a 412 from the local registry 414. Here, the collected local service record may be defined based on the Eureka registry policy and then the registry controller 510 may convert the local service record into a global registry format defined in the distributed system 400. Similarly, the registry controller 520 in the cluster-b 420 may collect a local service record (for example, in a format meeting the Zookeeper® registry policy) for the service-b 422 from the local registry 424, and then convert the collected local service record into the global registry format.

In embodiments of the present invention, the method 600 may be implemented at a primary registry controller that is deployed in a cluster in the distributed system 400. For example, the method 600 may be implemented at the registry controller 520, which is selected from the multiple registry controllers deployed in the multiple clusters, respectively. For example, a healthy registry controller with relative better performance may be selected as the primary registry controller. In order to find the healthy registry controller, the performance of each registry controller in each cluster may be monitored. Specifically, the state of the device on which the registry controller is deployed may be monitored.

For example, the monitored parameters may comprise but not limited to the Graphics Processing Unit (GPU) usage, the memory usage, the Application Programming Interface (API) calling number/frequency, the failed call number/frequency, whether the registry controller works as the primary registry controller, the last time when the registry controller worked as the primary registry, the number/frequency for the registry controller working as the primary registry, the size of the corresponding cluster, the framework type of the cluster, and so on.

In embodiments of the present invention, one or more of the above parameters may be considered for selecting the primary registry controller. For example, a registry controller that is deployed in a device with the lowest GPU usage may be selected. In another example, the above parameters may be weighted for determining a health score for each registry controller, and then a registry controller with the highest health score may be selected as the primary registry controller.

In embodiments of the present invention, machine learning techniques may be adopted for selecting the primary registry controller. For example, a state predicting model may be trained based on historical states collected at various historical time points, and then the state predicting model may be used to predicate a state of a device for a future time duration. Here, the state predicting model may be built based on various machine learning networks such as the Long Short Term Memory (LSTM) network, and so on. With respect to a specific cluster, the history states (e.g., collected at one or more previous time points within the recent hours) may be input into the state predicting model and a future state for the upcoming hours may be predicted. Based on the predicted future state for each cluster, a registry controller with the best future state may be selected as the primary registry controller.

During operations of the distributed system 400, states of the plurality of devices may change and another selecting procedure may be triggered ensuring that the best registry controller always works as the primary registry controller. In embodiments of the present invention, a timer with a time length of 5 hours (or other values) may be defined for the current primary registry controller. Once the timer is expired, another registry controller may be selected as the primary registry controller; alternatively, the current primary registry controller may be re-selected. In another example, the selecting procedure may be triggered if a failure occurs in the current primary registry controller. Once the primary registry controller is selected, other registry controllers may be identified as the secondary registry controllers. With these embodiments, a registry controller with the best performance may be the primary controller for the secondary registry controllers. Allowing for performance of service management to be implemented in more effectively.

The above paragraph has described details for obtaining the service record for each service in each cluster. With the obtained service records in the global format, a service entrance may be determined for discovering and calling each service. Referring back to FIG. 6, at a block 620, a first service entrance for calling the first service may be determined based on the first service record. Here, the first service entrance enables a second service that is deployed in a second cluster to call the first service. For example, once the registry controller 520 obtains the service record for the service-a 412, the registry controller 520 may determine the service entrance for calling the service-a 412 by another service in another cluster.

In embodiments of the present invention, the service entrance may be determined based on an access address of the first service in the first cluster. Specifically, an identification of the first service and an identification of the first cluster may be used for determining the service entrance: "service ID.cluster ID." With respect to the service-a 412 in the cluster-a 410, the service entrance may be determined based on the identification of the service ("service-a") and the identification of the cluster ("cluster-a"). In one example, the service entrance for the service-a 412 may be represented by: service-a.cluster-a. Further, the service-b 422 in the cluster-b 420 may call the service-a 412 in the cluster-a 410 by using the service entrance of "service-a.cluster-a".

It is to be understood that the above format is just an example, in other embodiments of the present invention, the service entrance may be represented by another format. For example, positions of the service ID and the cluster ID may be swapped, or another symbol such as "→" may be used for connecting the service ID and the cluster ID. In other embodiments of the present invention, the access address stored in a log file may be used for determining the service entrance. It is to be understood, the above paragraph just provides an example for determining the service entrance for discovering and calling the service-a 412 from another service in another cluster. Further, a corresponding service entrance may be generated for each service in each cluster. For example, another service entrance "service-b.cluster-b" may be generated by the registry controller 520 for the service-b 422 in the cluster-b 420. With these embodiments, the registry controller 520, which works as the primary registry controller 520, may generate respective service entrances for discovering and calling respective services among various clusters. Allowing services in different clusters to call each other by using the corresponding service entrances.

Figure 7:
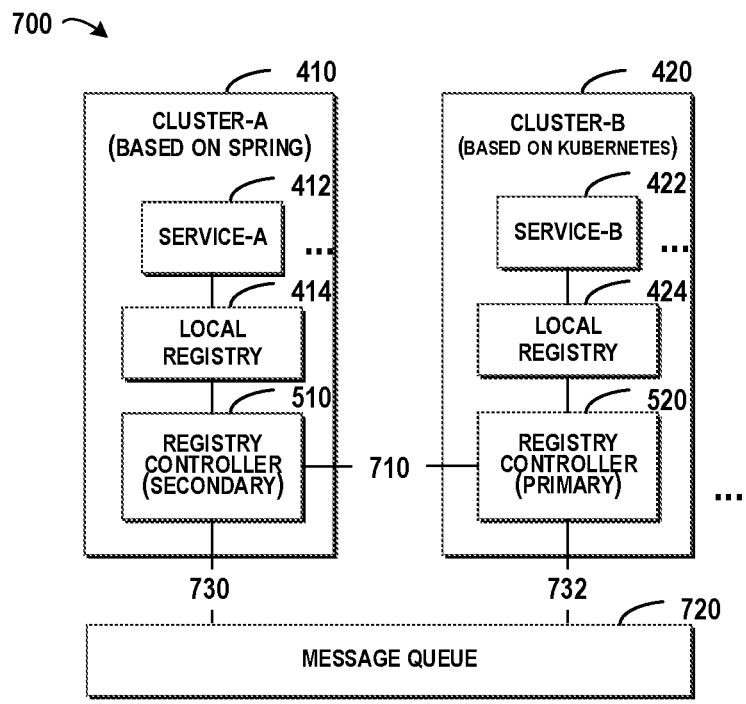
FIG. 7 depicts a procedure for communications among clusters in the distributed system according to an embodiment of the present invention.

Hereinafter, reference will be made back to FIG. 6 for more details about distributions of the determined service entrances. At block 630, the first service entrance may be provided to the second cluster. Specifically, the registry controller 520 may add multiple service entrances for multiple services into a message queue, and reference will be made to FIG. 7 for more details. FIG. 7 depicts a procedure 700 for communications among clusters in the distributed system 400 according to an embodiment of the present invention. In FIG. 7, the secondary registry controller 510 may send 710 to the primary registry controller 520 the service entrance for the service-a 412, and then the primary registry controller 520 may add the service entrance into the message queue 720. Further, the primary registry controller 520 may add the service entrance for the service-b 422 into the message queue 720. It is to be understood that FIG. 7 only illustrates the service-a 412 and the service-b 422. In other embodiments of the present invention, the distributed system 400 may comprise more services and then the primary registry controller 520 may add more service entrances for the more services into the message queue 720.

Further, service entrances in the message queue 720 may be distributed to the respective clusters. For example, each service entrance in the message queue 720 may be transmitted to the respective clusters. Specifically, the service entrance for the service-b 422 may be transmitted 730 to the cluster-a 410, for example, via the secondary registry controller 510; and the service entrance for the service-a 412 may be transmitted 732 to the cluster-b 420, for example, via the primary registry controller 520. With these embodiments, each cluster may be provided with the service entrance for calling service(s) outside the cluster. Therefore, service(s) in each cluster may call other service(s) in other cluster(s) in a more effective way.

Figure 8:
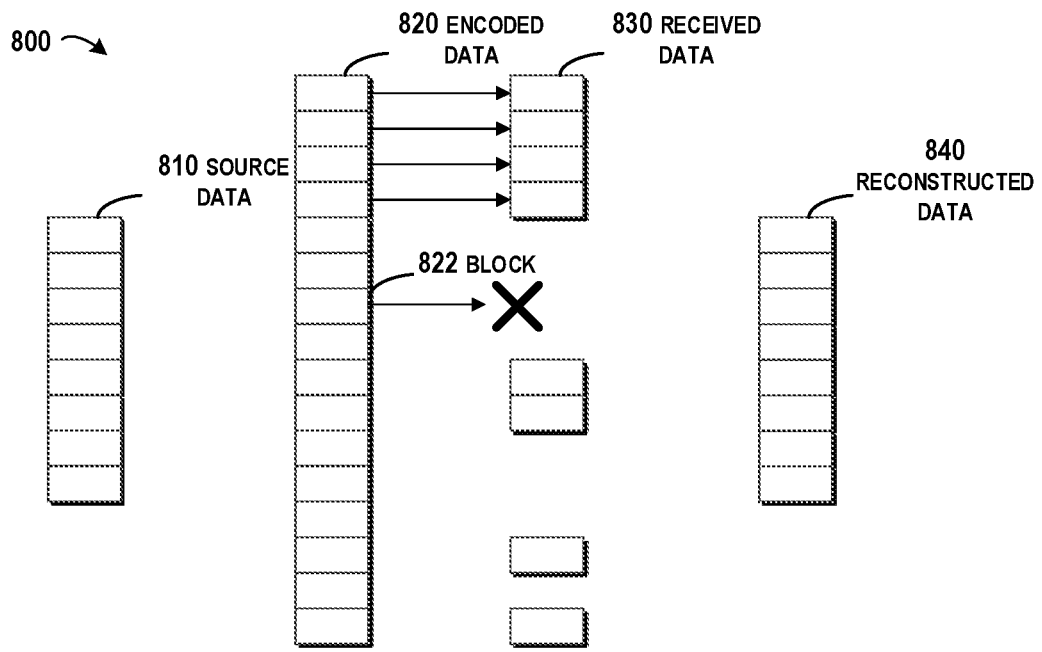
FIG. 8 depicts a procedure for distributing the message queue according to an embodiment of the present invention.

In some embodiments of the present invention, data in the message queue 720 may be encoded into a message packet, such that redundancy data may be included in the message packet during communication. FIG. 8 depicts a procedure 800 for distributing the message queue according to an embodiment of the present invention. In FIG. 8, source data 810 represents the data that are originally stored in the message queue 720. In order to increase the security of the data distribution, redundancy data such as the error correction code may be included in the encoded data 820. At this point, even if one or more data block fails to reach the target cluster in the received data 830, data in the message queue 720 may be reconstructed from the received data. For example, if a block 822 which relates to the redundancy data is lost during the data communication, the received data 830 is still enough for reconstructing the message queue 720. With these embodiments, the service may be managed in a robust, secure, and effective way.

Figure 9:
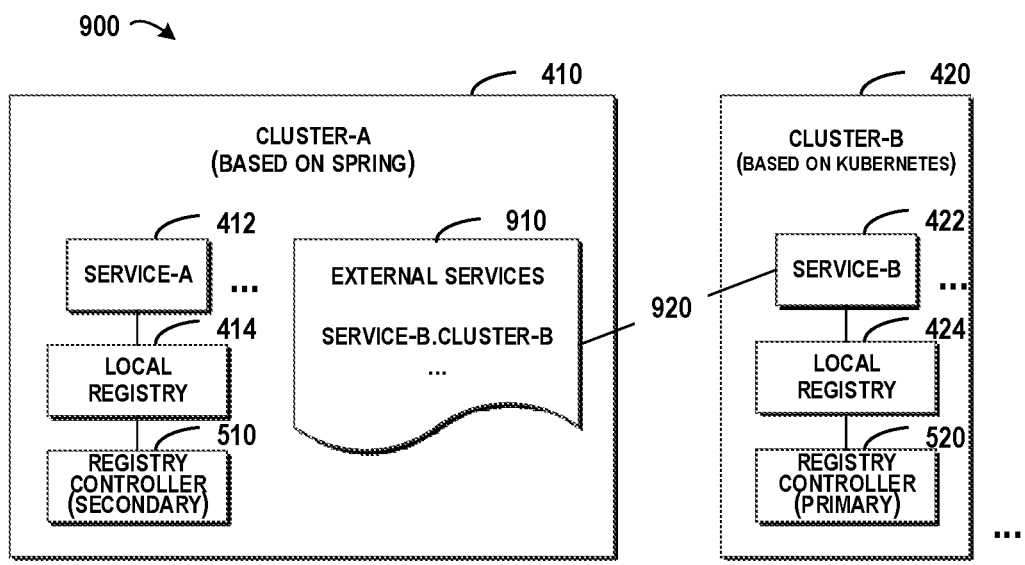
FIG. 9 depicts a procedure for calling a service in a cluster by another service in another cluster according to an embodiment of the present invention.

In embodiments of the present invention, one service may be instructed to use the received service entrance to call the corresponding service in another cluster. FIG. 9 depicts a procedure 900 for calling a service in a cluster by another service in another cluster according to an embodiment of the present. Here, services that are defined in one cluster may be discovered by services that are defined in another cluster. In FIG. 9, the service entrance in the message queue may be discovered as external services 910. Specifically, "service-b.cluster-b" may be used by the service-a 412 for calling the service-b 422 in the cluster-b 420.

It is to be understood that FIG. 9 shows a situation where only one service-b 422 is deployed in the cluster-b 420, alternatively and/or in addition to, more clusters may be comprised in the distributed system 400 and more services may be deployed in each cluster. Supposing a service named "service-c" is deployed in a cluster named "cluster-c" (not depicted) in the distributed system 400, then a registry controller may be deployed in the cluster-c, and a service entrance "service-c.cluster-c" may be transmitted to each of cluster-a 410 and cluster-b 420. At this point, the external services 910 may comprise another service entrance "service-c.cluster-c" (not depicted) for enabling the service-a 412 to call the service-c in the cluster-c. With these embodiments, one service in one cluster is not limited to call services that are defined in its own cluster. Instead, the one service in one cluster may call all services that are defined in the distributed system 400, regardless of whether the services are internal services or external services. Therefore, services are shared and reused among all the clusters in the distributed system 400.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, a first service record for a first service that is deployed in a first cluster in a distributed system, the first service record being represented in a global registry format defined in the distributed system;
monitoring, by the one or more processors, a plurality of states of a plurality of devices;
selecting, by the one or more processors, a primary registry controller from a plurality of registry controllers based on the plurality of states, wherein the computer-implemented method is executed at the primary registry controller that is deployed in a first cluster in the distributed system;
determining, by the one or more processors, a first service entrance for calling the first service based on the first service record, the first service entrance enabling a second service to call the first service, the second service being deployed in a second cluster in the distributed system; and
providing, by the one or more processors, the first service entrance to the second cluster.

2. The computer-implemented method of claim 1, wherein the obtaining the first service record comprises:
receiving, by the one or more processors, the first service record from a first registry controller that is deployed in the first cluster, the first service record being generated by the first registry controller based on a local service record that is represented in a local registry format defined in the first cluster.

3. The computer-implemented method of claim 1, wherein the determining the first service entrance for the first service comprises:
determining, by one or more processors, the first service entrance based on an access address of the first service in the first cluster.

4. The computer-implemented method of claim 1, wherein selecting the primary registry controller from the plurality of registry controllers based on the plurality of states comprises:
predicting, by the one or more processors, a plurality of future states of the plurality of devices based on the plurality of states and a state predicting model, respectively, the state predicting model representing an association between a state of a device for a future time duration and a state of the device at a historical time point.

5. The computer-implemented method of claim 1, wherein the primary registry controller is selected in response to any of:
a predefined timer being expired; and
a failure occurring in the primary registry controller.

6. The computer-implemented method of claim 1, wherein the providing the first service entrance to the second cluster comprises:
adding, by the one or more processors, the first service entrance into a message queue; and
distributing, by the one or more processors, the message queue to the second cluster.

7. The computer-implemented method of claim 6, wherein the distributing the message queue comprises:
generating, by the one or more processors, a message packet by encoding the message queue and a redundancy portion of the message queue; and
transmitting, by the one or more processors, the generated message packet to a second registry controller that is deployed in the second cluster.

8. The computer-implemented method of claim 1, wherein the first and second clusters have heterogeneous frameworks, and the method further comprises: instructing, by one or more processors, the second service to call the first service by using the first service entrance.

9. A computer system, comprising a computer processor coupled to a computer-readable memory device, the memory device comprising instructions that when executed by the computer processor implements a method comprising:
obtaining a first service record for a first service that is deployed in a first cluster in a distributed system, the first service record being represented in a global registry format defined in the distributed system;
monitoring a plurality of states of a plurality of devices;
selecting a primary registry controller from a plurality of registry controllers based on the plurality of states, wherein the computer-implemented method is executed at the primary registry controller that is deployed in a first cluster in the distributed system;
determining a first service entrance for calling the first service based on the first service record, the first service entrance enabling a second service to call the first service, the second service being deployed in a second cluster in the distributed system; and
providing the first service entrance to the second cluster.

10. The computer system of claim 9, wherein the obtaining the first service record comprises:
receiving the first service record from a first registry controller that is deployed in the first cluster, the first service record being generated by the first registry controller based on a local service record that is represented in a local registry format defined in the first cluster.

11. The computer system of claim 9, wherein the determining the first service entrance for the first service comprises:
determining the first service entrance based on an access address of the first service in the first cluster.

12. The computer system of claim 9, wherein selecting the primary registry controller from the plurality of registry controllers based on the plurality of states comprises:
predicting a plurality of future states of the plurality of devices based on the plurality of states and a state predicting model, respectively, the state predicting model representing an association between a state of a device for a future time duration and a state of the device at a historical time point.

13. The computer system of claim 9, wherein the primary registry controller is selected in response to any of:
a predefined timer being expired; and
a failure occurring in the primary registry controller.

14. The computer system of claim 9, wherein the providing the first service entrance to the second cluster comprises:
adding the first service entrance into a message queue; and
distributing the message queue to the second cluster.

15. The computer system of claim 14, wherein the distributing the message queue comprises:
generating a message packet by encoding the message queue and a redundancy portion of the message queue; and
transmitting the generated message packet to a second registry controller that is deployed in the second cluster.

16. A computer program product, the computer program product comprising a computer readable storage device having program instructions embodied therewith, the program instructions executable by an electronic device to cause the electronic device to perform a method, the method comprises:
obtain a first service record for a first service that is deployed in a first cluster in a distributed system, the first service record being represented in a global registry format defined in the distributed system;
monitor a plurality of states of a plurality of devices;
select a primary registry controller from a plurality of registry controllers based on the plurality of states, wherein the computer-implemented method is executed at the primary registry controller that is deployed in a first cluster in the distributed system;
determining a first service entrance for calling the first service based on the first service record, the first service entrance enabling a second service to call the first service, the second service being deployed in a second cluster in the distributed system; and
provide the first service entrance to the second cluster.

17. The computer program product of claim 16, wherein the obtaining the first service record comprises:
receiving the first service record from a first registry controller that is deployed in the first cluster, the first service record being generated by the first registry controller based on a local service record that is represented in a local registry format defined in the first cluster.

18. The computer program product of claim 16, wherein selecting the primary registry controller from the plurality of registry controllers based on the plurality of states comprises:
predicting a plurality of future states of the plurality of devices based on the plurality of states and a state predicting model, respectively, the state predicting model representing an association between a state of a device for a future time duration and a state of the device at a historical time point.

19. The computer program product of claim 16, wherein the primary registry controller is selected in response to any of:
a predefined timer being expired; and
a failure occurring in the primary registry controller.

20. The computer program product of claim 16, wherein the providing the first service entrance to the second cluster comprises:
adding the first service entrance into a message queue; and
distributing the message queue to the second cluster.

* * * * *